Feb. 28, 1928.

E. J. ANDERSON 1,660,467

LABELING MACHINE

Filed Dec. 10, 1926    6 Sheets-Sheet 1

Inventor
Enoch J. Anderson
By Southgate Fay & Horsley
Attorneys

E. J. ANDERSON

1,660,467

LABELING MACHINE

Filed Dec. 10, 1926    6 Sheets-Sheet 5

Inventor
Enoch J. Anderson
By Southgate Fay & Hockey
Attorneys

Feb. 28, 1928.

E. J. ANDERSON

LABELING MACHINE

Filed Dec. 10, 1926      6 Sheets-Sheet 6

Inventor
Enoch J. Anderson
By Southgate Fay & Harley
Attorneys

Patented Feb. 28, 1928.

1,660,467

UNITED STATES PATENT OFFICE.

ENOCH J. ANDERSON, OF WORCESTER, MASSACHUSETTS.

LABELING MACHINE.

Application filed December 10, 1926. Serial No. 153,976.

This invention relates to a machine capable of labeling tin cans and similar articles but particularly adapted for labeling pails and buckets provided with a bail.

The principal objects of the invention are to provide a construction in which means will be provided for receiving the bail or the like on the opposite sides of one end of the bucket or pail for rolling on the label as the article to be labeled is rolled along a path through the machine; to provide means whereby the insertion of the article to be labeled will start the machine into operation and it will operate through one complete rotation and then stop automatically; to provide means for automatically lifting the article into a position to roll along between two surfaces; to provide means whereby the article is rolled along a soft and yielding surface for pressing the label down thereon in its final smoothed condition by engagement with a revolving drum; to provide a suction arrangement for holding the forward end of the label on the drum and automatic means for connecting it to, and disconnecting it from, a source of suction at the proper times; to provide a flexible layer over the surface of the drum on which the labeled area of the can engages; to provide means for holding the same taut on the surface of the drum; to provide means for attaching two labels, one after the other, on opposite sides of the same article by simple operating means; and to provide an improved form of label holder and improved form of gumming device.

Other objects and advantages of the invention will be hereinafter described.

Reference is to be had to the accompanying drawings in which.

This machine is designed to label pails 10 of varnish, paint or other material in which each pail is provided with a bail 11. It will be noticed that these bails necessitate a pair of opposite projections 12 near the upper end of each pail or bucket. This constitutes an objection to the labeling of these articles in the ordinary ways. Labeling machines designed for tin cans and bottles are not easily changed over so as to provide for these projections. Furthermore these are labeled with two labels, one on each side, together extending almost entirely around the circumference.

I have shown the invention as comprising a frame 13 on which is supported a motor (not shown) for operating the device, if it is to be operated by a motor, and it is also provided with a suction producing machine (not shown) operated by the same power for a purpose to be described hereinafter. The power is received either from the motor, or from a pulley elsewhere, on a pulley 15 or other wheel, which through a pinion 16 drives a gear 17 loose on a shaft 18. This shaft is positively fixed in the frame 13 and cannot rotate.

Figures 5, 6, 7:
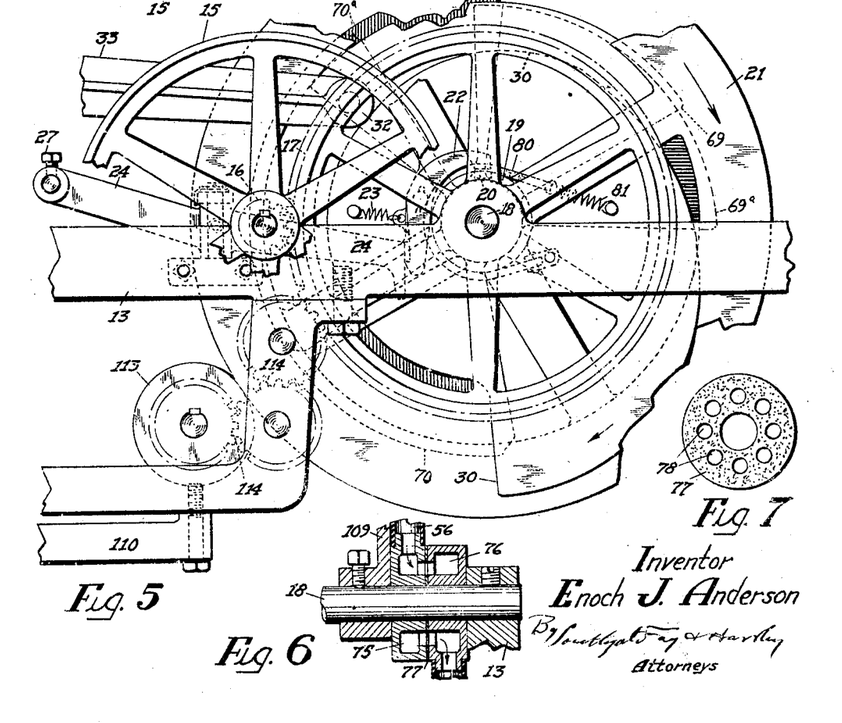
Fig. 5 is a side view of the same with parts broken away, showing the side opposite that seen in Fig. 1.
Fig. 6 is a sectional view on the line 6—6 of Fig. 4 showing the means for connecting the suction.
Fig. 7 is a side view of the perforated packing sheet therefor.

The gear 17 is provided with a hub 19 fixed thereon which has a notch 20 in its circumference. Rotatable on the stationary shaft 18 is a skeleton drum comprising a pair of discs 21. These discs are connected across by bars 49 and other elements and rotate together on the stationary shaft. On one of these discs 21 is pivoted a latch 22 which engages with the notch 20 in the hub to drive the machine. When the latch engages in the notch, the latch is forced to turn with the hub 19, taking with it the disc 21 on which the latch is pivotally mounted. The latch is normally swung into locking position by a spring 23 connected with a pin on the disc 21. The end of the latch is operated upon by the end of a lever 24, pivoted on a vertical tangent axis, which normally engages the end of the latch and holds it out of operative position as shown in Fig. 5.

Figures 1, 8:
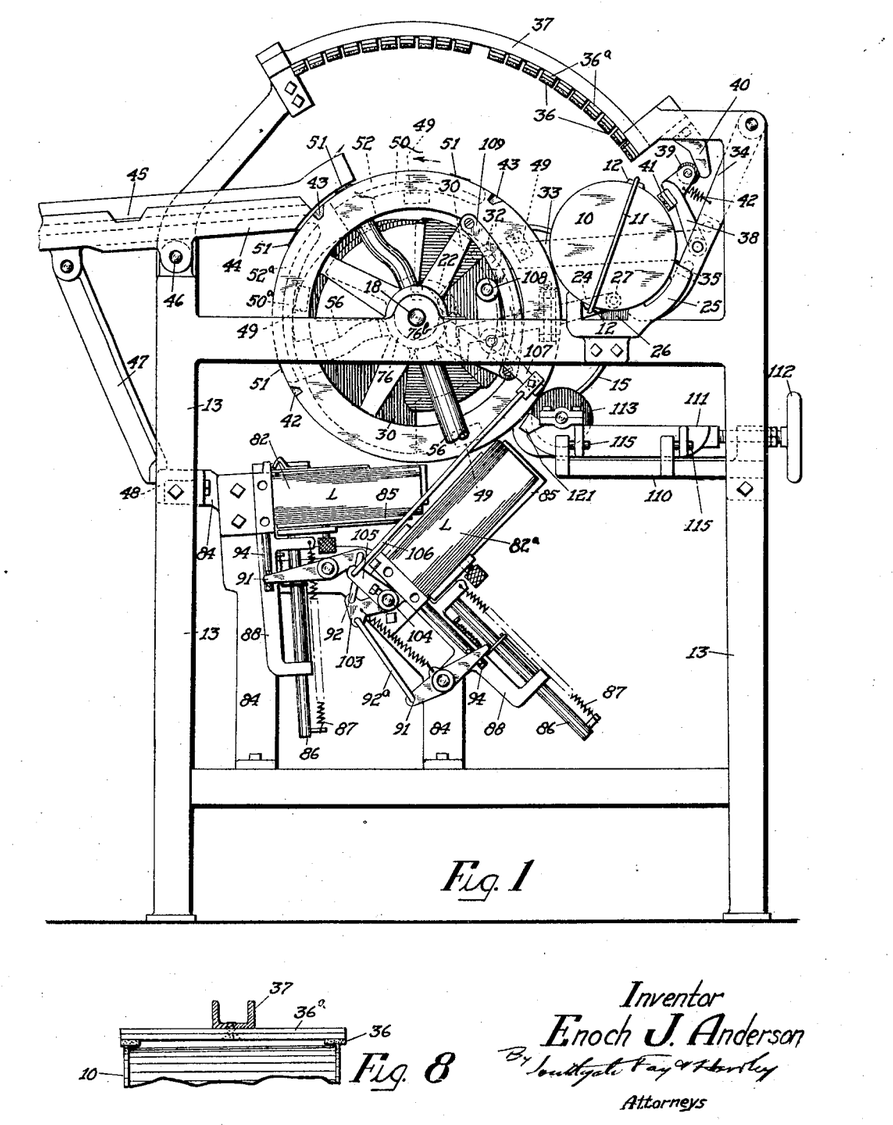
Fig. 1 is a side elevation of a machine constructed in accordance with this invention.
Fig. 8 is a transverse sectional view of the means for pressing the article on the drum.

When a receptacle 10 is to be labeled, it is moved in on a horizontal support and guide 25 which has a notch 26 at one side for receiving the bail 11. Therefore the receptacle is always put in in one position as indicated in Fig. 1. It is pushed along the slide 25 by hand until the end of the pail or other receptacle engages a head 27 on the lever 24. This operates the lever as shown, especially in Fig. 3, so that its end moves over beyond the end of the latch 22 in opposition to a spring 29. Then the spring 23 will be free to force the latch into the notch 20 the next time it comes around and then these parts will rotate around one complete revolution as will appear.

This provides for the starting of the machine. When it starts a cam 30, fixed to one disc 21, has been stopped at the end of the last revolution in such position that it soon engages a roll 32 on a lever 33 and lifts it. This lever 33 is fixed to a rocking arm 34 pivoted near the top of the frame and provided with a rest 35 for the article to be labeled. This action therefore brings this article 10 up from the position shown in Fig. 1 to that shown in Fig. 2 where it engages the circumferences of both discs 21 and also engages a set of soft pads 36 which are located on resilient cross bars 36ª arranged in curved formation on a support 37 that extends across the top of the frame 13. These bars are capable of yielding, being supported at their centers.

Figure 2:
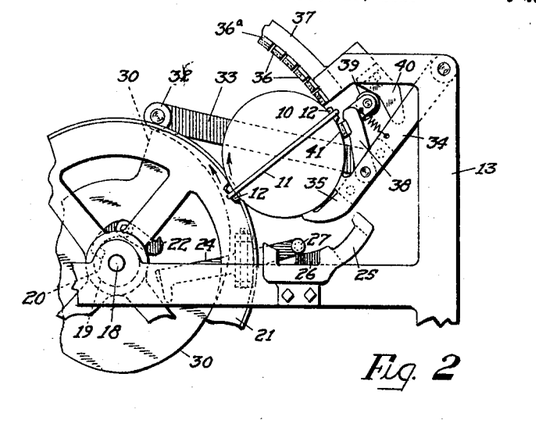
Fig. 2 is a fragmentary side elevation on reduced scale showing the starting of the labeling operation with the article to be labeled in a more advanced position than in Fig. 1.

Another action that takes place is that an arm 38 pivoted on the arm 34 is provided with a roller 39 which engages a stationary cam 40 when this arm is lifted. This brings a resilient pad 41 on the arm 38 into contact with the receptacle 10 in opposition to a spring 42. The cam holds it there as shown in Fig. 2 to insure sufficient pressure to hold the can or receptacle against the circumferences of the discs 21. It will be noted that the ends of the bail 11 and the projections in which they are mounted are provided for. One of them is located in the space between the pad 41 and the first pad 36 and the other is located in a notch 43 of which there are three around the circumference of one of the discs 21. It will be seen that the can or receptacle is lifted by the rest 35 and brought into contact with these pads so that it will necessarily roll therealong and the labels which have been supplied in a manner to be described hereinafter will be smoothed out on the can or receptacle.

When the receptacle reaches the end of its stroke, which is at the end of the curved support 37, it will pass on a discharge chute 44 and roll out by gravity. This discharge chute is also provided with a notch 45 on one side for receiving the end of the bail. When the machine is to be shipped or put out of use for a period, this discharge chute can be swung on its pivot 46 by first disconnecting its strut 47 from an angle iron 48 on the frame and then it will hang substantially vertically.

Figures 9, 12:
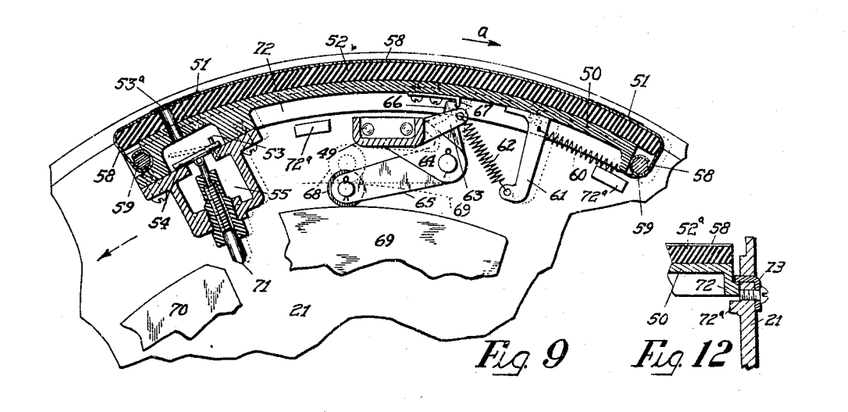
Fig. 9 is an enlarged transverse sectional view of the rotary drum showing the cams for controlling the suction and the moving of the pad on the drum for receiving the label.
Fig. 12 is a transverse sectional view on the line 12—12 of Figs. 10 and 11.
Figure 10:
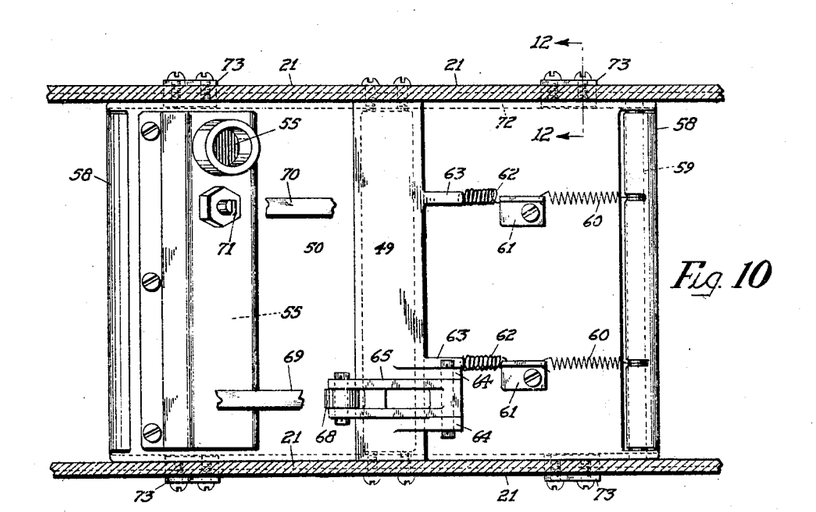
Fig. 10 is an under side view of the same with the drum shown in section.
Figure 11:
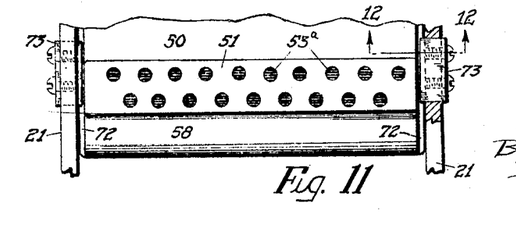
Fig. 11 is a plan of the perforated area.

The shaft 18 as stated, is held stationary in its bearings on the frame 13 and I have shown screws for holding it in that position. It has also been stated that the two discs 21 constitute a rotatable labeling drum. These discs shown in Figs. 9, 10 and 11 are connected across by several members including two bars 49 which are secured at their ends to the two discs and two transverse suction boxes 53. Between the discs and carrying the suction boxes there are two loose plates 50 and 50ª, one for each label. These plates are of arcuate shape and are designed to receive pads 52 and 52ª. The suction box is connected by a port down through the movable plate 50 to a suction passage 55. The port between the suction box and passage is normally closed by a valve 54, but when this valve is opened the perforated surface communicates with the suction passage 55, which, through a pipe 56, is connected to a suction device (not shown but continuously operating).

The suction hose 56 is connected with the source of suction through a pair of annular chambers 75 and 76 mounted on the shaft 18 which have between them a packing disc 77. This disc and the sides of the chambers are provided with perforations 78 to permit the air to pass through intermittently during rotation. The box containing the chamber 76 is stationary while the chamber 75 rotates with the drum. A bracket 76$^a$ holds the member 76.

The labels are taken up, one at a time, on the outside surface of each pad 52 and this is provided with a woven fabric or felt blanket 58 held by rods 59 at its opposite ends. The rod on the front end is held positively in a recess and the rod at the rear is held under tension by a series of springs 60 which draw the fabric taut. These springs are mounted on brackets 61 projecting inwardly from the plate 50. These brackets are connected by springs 62 with arms 63 on the fixed cross piece 49 to normally force the loose plate 50 upwardly and forwardly. On rigid arms 64 carried by this cross piece 49 and projecting inwardly is pivoted a lever 65 having a projection 66 adapted to engage a bracket 67 on the bottom of the plate 50 and push that plate over rearwardly to wipe and smooth out the label on the can or pail. The end of the lever 65 is provided with a roll 68 adapted to be engaged by a stationary cam 69 to operate the lever when this drum rotates to a certain position. The blanket 58 has two raised surfaces 51, one being perforated at 53$^a$.

All this construction is repeated at another adjacent point for the purpose of providing a similar arrangement for the other label as will be understood, but it will be necessary to describe only one. The other plate 50$^a$ is operated by a companion cam 69$^a$. The purpose of this mechanism is to move the plate and its pad so that the label will be laid smooth on the receptacle.

Another cam 70 in fixed position is engaged by a plunger 71 carried by the suction conduit 55 to operate the valve 54 against the resistance of its spring to open it and allow the perforations in the surface 51 to communicate with the source of suction. In this way the forward end of the label is held down while the body of it is pressed against the pad 52. There is a second cam 70$^a$ which performs the same function for the other pad.

It will be understood that the plate 50 is provided with a projecting edge 72 adapted to be received on a ledge or plurality of lugs 72$^a$ on each disc 21. A series of clips 73 are held by screws on the discs 21 to insure the holding of this plate 50 in position, but the parts are loose enough to allow some play of the plate 50 which is loose and is adapted to move.

The hub of one disc 21 is borne upon by a stop friction strap 80. This strap is held at one end by a stud on the disc 21 itself and at the other end by a stud with a spring connection 81. In this way when the clutch is disconnected the parts will come to a stop very soon. This occurs when a revolution is completed and is caused by the tail of the latch 22 engaging under a projection on the end of the lever 24, which of course returns to normal position as soon as the can 10 is lifted above it at the beginning of the rotation.

As two labels L are to be applied to the article or can 10 I have provided two label holders 82 and 82$^a$. These are mounted on brackets 84 on the frame at an angle to each other so as to deliver the labels to the two pads 52 and 52$^a$ located adjacent to each other on the drum and so that each one will be delivered tangentially. The labels are piled up in the label holders as indicated in Fig. 1, in such position that both labels will be taken off at the right time. The two label holders are constructed alike except for their positions. Their connections to the operating mechanism are very similar but not exactly alike, but they are connected so that they work in the proper sequence. Therefore only one of them will be described in detail.

Figures 13, 14, 15, 18:
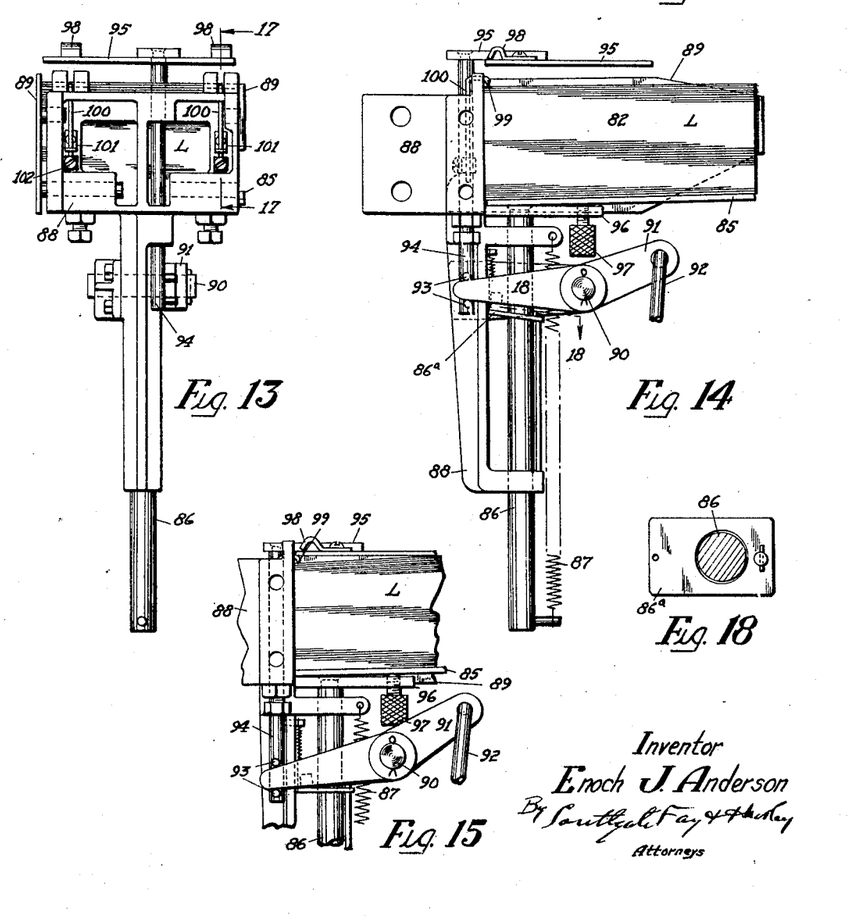
Fig. 13 is an end view of one of the label holders.
Fig. 14 is a side view thereof.
Fig. 15 is a similar side view showing the parts in a different position.
Fig. 18 is a sectional view on the line 18—18 of Fig. 14.
Figure 16:
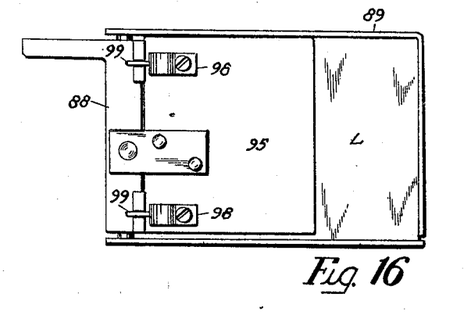
Fig. 16 is a plan of the label holder.
Figure 17:
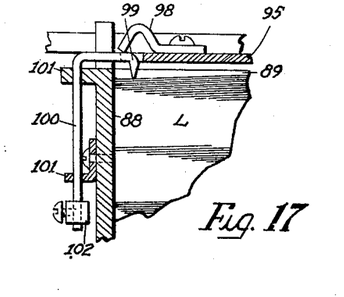
Fig. 17 is a sectional view on the line 17—17 of Fig. 13 showing the means for holding down the top label.
Figure 19:
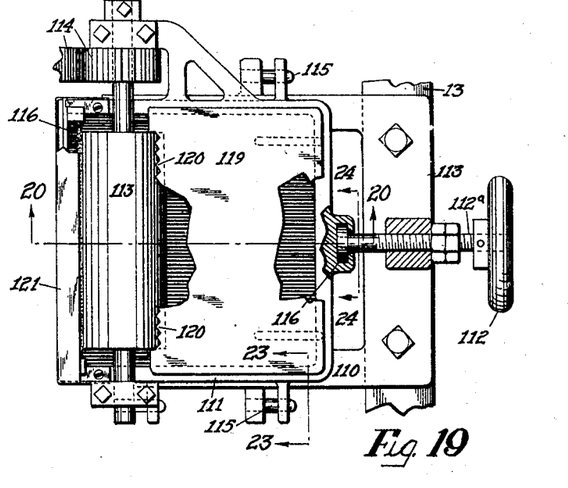
Fig. 19 is a plan of the gumming device.
Figure 20:
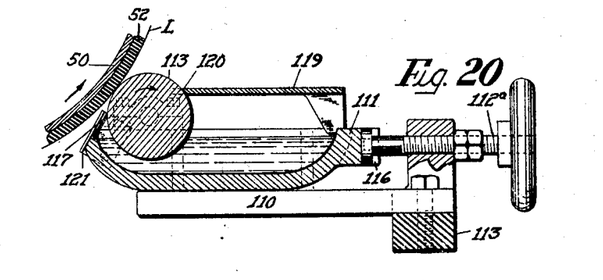
Fig. 20 is a sectional view of the same on the line 20—20 of Fig. 19.
Figure 21:
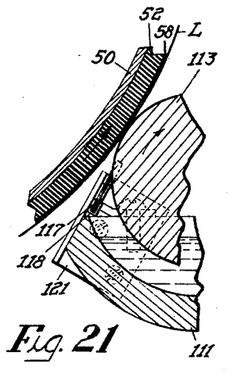
Fig. 21 is a similar sectional view on enlarged scale.

Each label holder comprises a box having a bottom 85 which is mounted on a plunger 86 that is constantly urged upwardly by a spring 87, the plunger having a guide in a frame 88 which is secured on one of the brackets 84. This frame 88 has an arm for receiving the opposite end of the spring 87. The label holder has sides 89 the shape of which is indicated in Fig. 14 bent over to form one end. They cooperate with the bottoms, the bottoms of course moving upwardly as the labels are exhausted. The frame 88 is provided with an arm projecting inwardly, on which is a stud 90 which carries a lever 91 operated by a link 92 as will appear later. This lever projects between pins 93 on a slide 94 which is guided in the frame 88 and has a top plate 95. This top plate does not extend over the whole length of the labels, but leaves their outer ends free and is adapted to be moved upwardly as shown in Figs. 13 and 14 or to come down on the labels as shown in Fig. 15. Also the bottom 85 is adjusted with respect to an integral plate 96 by an adjusting screw 97, the plate 96 constituting part of the frame 88. The top plate 95 is provided with a pair of clips 98 which, when the top is lowered, bear on hooks 99 to force them down against the top label. These hooks are pointed so that they prevent the accidental displacement of the label or the taking of two labels at a time. These hooks constitute extensions on wire rods 100 which are guided in projections or brackets 101 on the frame 88 and are capable of moving up and down, being normally held down by weights 102.

It will be seen, therefore, that each time the link 92 is operated and the cover 95 is raised and then lowered, the hooks 99 are forced down on the top label and thus held there by their weights so as to provide a small amount of resistance to the displacement of the label. The labels are taken off by the suction surface 51 and the top is raised automatically to free the labels and allow them to be taken off by the action of the link 92. In the position shown in Fig. 15 the spring 87 is free to raise the plunger 86 and the bottom of the label holder to press the top label upwardly, as the lever 91 has forced a ratchet plate 86ª down to free said plunger. In Fig. 14 this ratchet plate is shown raised at one side so that it binds the plunger 86. In referring to the link 92, I intend to include a companion link 92ª. One is connected with each of the label boxes and both pivotally connected with an arm 103 which is pivoted on a stud 104 on which is another arm 105. This arm is connected by a link 106 to a lever 107 which has a cam roll 108 operated by a cam 109 which rotates with the discs 21. Therefore, once during each rotation the label holders will be operated to raise the top and this operation will come just as the two pads 52 come to proper position for receiving the two labels from the two label boxes. The two labels are taken on the drum, one beyond the other, and applied to the opposite sides of the can 10 by the rolling motion above described.

The gumming device comprises a support 110 and a tank 111 for the glue. This tank can be adjusted back and forth by a hand-wheel 112 and screw 112ª as shown. It is provided with a gumming roll 113 which engages the label on the pad 52. This gumming roll is geared by gearing 114 to the gear 17. The tank 111, which can be shifted back and forth, is connected with longitudinal pins 115 mounted in lugs in the support 110 so as to guide the tank in all positions. The end of the screw 112ª is connected with the tank by an open bottom slot 116 so that the tank can be lifted off after the screw is turned up to bring the tank out of contact with the pins 115.

Figure 22:
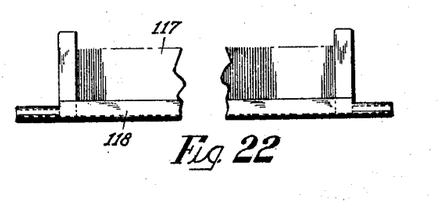
Fig. 22 is a side view of the brush for cleaning the gum roll.
Figure 23:
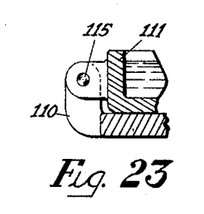
Fig. 23 is a sectional view on the line 23—23 of Fig. 19.
Figure 24:
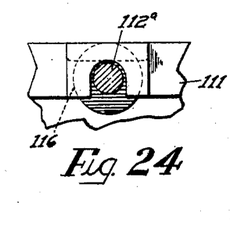
Fig. 24 is a sectional view on the line 24—24 of Fig. 19.

The tank is also provided with a brush 117 at the end bearing on the roll 113 tending to wipe or spread the glue on the surface of the roll. This brush is made with a frame 118 of doubled over sheet metal with soft bristles mounted in it as shown in Fig. 22. The tank is provided with a cover 119 having teeth 120 for preventing the labels from being drawn down into the glue. A guard 121 formed of sheet metal is secured just in front of the brush to keep glue from dripping on the labels below.

After the drum rotates beyond the discharge position where the cans or buckets are delivered to the discharge chute 44, the two pads 52 and 52ª come around toward the bottom from the position shown in Fig. 1. The lever 24 is engaged by the latch 22 and the clutch is disconnected, thus stopping the machine.

Figure 3:
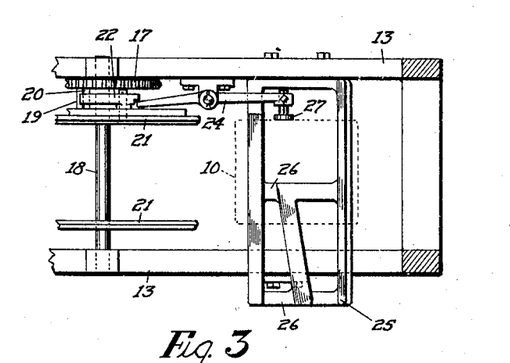
Fig. 3 is a plan of the means for receiving the article to be labeled showing the means for starting the machine thereby.
Figure 4:
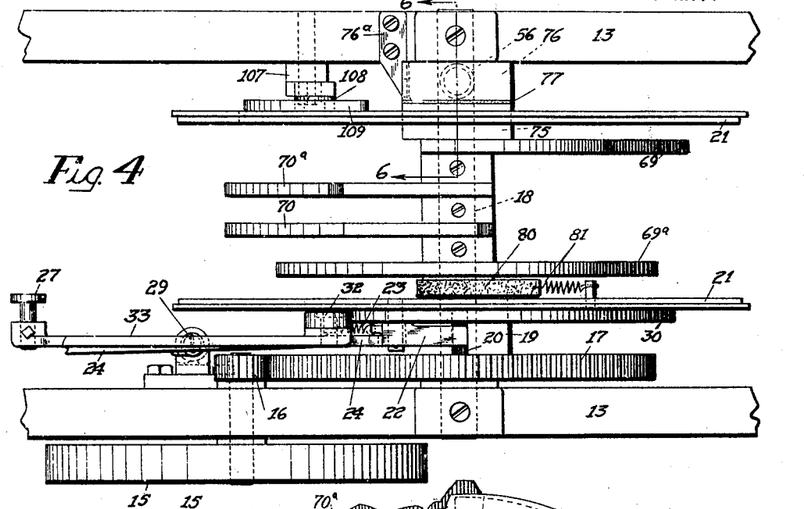
Fig. 4 is a plan on enlarged scale of the main part of the frame showing the operating cams especially.

The pail or bucket is now placed by hand on the guide 25 in the position shown in Fig. 2 and shoved in until its bottom engages the head 27. This moves the lever 24 over as shown in Fig. 3 so that it no longer holds the latch 22 up. This latch is then pushed down by the spring and the next time the notch 20 comes around the latch will swing into it. This causes the drum composed of the two discs 21 to start to rotate, as the latch 22 is pivoted on one of them.

When the pads 52 and 52ª get adjacent the label holders, the cam 109 operates the link 106 and consequently the links 92. The two links 92 actuate the levers 91 to pull up the two tops 95. This releases the top label so that the perforated surface 51 on each pad 52 and 52ª will engage the forward ends of the respective labels in proper sequence. The valves 54 will open and the leading end of each label will be taken into contact with the pad 52 or 52ª, or rather the blanket over it and will be carried away from the label holder, spaced properly apart. Of course at this time the hooks 99 are in engagement with the top label but they are held down only by the weights 102 and not by the positive action of the lever 91 on the top plate 95. Consequently the force of the rotating drum with the suction will be sufficient to conduct the two labels away, one behind the other. The two pads 52 and 52ª are both long enough to carry a label spread out thereon, so these two labels follow one another and are both supplied with paste from the paste roller 113 which has been described in connection with the last sheet of the drawings. Now as the drum comes around so as to bring the labels up above the paste roller 113 the cam 30 engages the roll on the arm 33 and the rest 35 is moved upwardly to bring the can into the position shown in Fig. 2 so that the further rotation of the drum will roll the can along and take up and smooth down the labels as stated above.

The bars 36ª are all capable of twisting and yielding to accommodate the pails. As the pails are rolled along, the plates 50 and 50ª are held yieldingly outwardly by springs 62 to wipe the labels on the opposite sides of the cans. The air valves 54 are released by the cams 70 and 70ᵃ in sequence also to shut off the suction.

It will be seen that by this machine a pail of paint, varnish or any other material, having a bail upon its can be provided with a label on each side during its course through the machine. The label is not only held down yieldingly on the surface of the can but it is wiped on and stretched out smooth by the action of the pad 52. At the same time the arcuate series of pads 36 are arranged in stationary position so as to force the can against the pad with the label on the surface of the can which engages the pad, so as to help secure the above mentioned result. These pads are mounted on the ends of flexible bars which are capable of being twisted and bent to accommodate any irregularities in shape or position of the cans. The arrangement is such that the pads 36 are all stationary and rotate the cans by the revolution of the drum. The air suction control is simple and effective. The automatic stopping of the device is of the simplest character while the starting of the machine is effected by introducing the can.

Although I have illustrated and described only a single form of the invention, I am aware of the fact that modifications can be made therein by any person skilled in the art without departing from the scope of the invention as expressed in the claims. Therefore I do not wish to be limited in these respects, but what I do claim is:—

1. In a labeling machine, the combination with a rest for an article to be labeled, of means at the end of the rest adapted to be engaged by the article, when moved into labeling position on the rest, for starting the machine into operation, and means for lifting the article off said rest to place it in proper position for smoothing the labels out upon it.

2. In a labeling machine, the combination with a rotatable drum having a surface thereon for receiving labels, of a power operated wheel for operating the drum, means for connecting the drum with the power operated wheel for driving it, and means in position to be engaged by the article to be labeled when placed in labeling position to clutch the wheel to the drum and start the latter into operation.

3. In a labeling machine, the combination with a rotatable drum having a surface thereon for receiving labels, of a power operated wheel for operating the drum, means on the labeling drum for connecting the drum with the power operated wheel for driving it, said means being normally held out of position, a rest for the article to be labeled, and means in position to be engaged by the article to be labeled when placed in labeling position on the rest for releasing the connecting means and allowing the same to clutch the wheel to the drum and start the latter into operation.

4. In a labeling machine, the combination with a rotatable drum having a surface thereon for receiving the label, a rest for the article to be labeled arranged transversely, means at the end of the rest adapted to be engaged by an article to be labeled, when put in labeling position on the rest, for starting the labeling drum, means operated by the labeling drum for raising the article out of the rest into contact with said surface of the drum, and a curved support concentric with the drum for engaging the other side of the article, whereby when the article is rotated on its own axis by the drum it will roll along said surface and the label thereon will be spread out smoothly on the article.

5. In a labeling machine, the combination with a rotatable drum having a surface thereon for receiving the label, means operated by the labeling drum for raising the article into contact with said surface on the drum, and a curved support for engaging the other side of the article, whereby when the article is rotated on its own axis by the drum it will roll along said surface and the label thereon will be spread out smoothly on the article.

6. In a labeling machine, the combination with a rotatable drum for labeling an article provided with a bail, of a support located concentric with the drum and at a distance from it equal to the diameter of the article to be labeled, said support and the drum having notches for receiving the ends of the bails on the articles, means for lifting the article into contact with the support and labeling drum in such position that the end of the bail will come at the end, and means for simultaneously engaging the article at the opposite side of the end of the bail.

7. In a labeling machine, the combination with a pair of discs constituting a labeling drum and having a surface thereon for receiving a label, of a support concentric with the drum and having a padded surface at a distance from the drum equal to the diameter of the article to be labeled, whereby the engagement of the article with the label will roll the article along said surface and spread out the label smoothly on the article, said drum and support both having notches in position to receive the ends of the bail on the article to be labeled.

8. In a labeling machine, the combination with a rotatable labeling drum having a surface for receiving a label and a support having a surface along which the article to be labeled can be rolled by the rotation of the drum to spread out the label smoothly on the article, of a discharge chute for the articles to be labeled pivoted to the frame of the machine and adapted to receive the articles from the drum, the discharge chute having notches for the ends of the bails of the articles to be labeled and having a readily disengageable strut for holding it in operative position when in use.

9. In a labeling machine, the combination with a rotatable drum having a pad for receiving the label and applying it to the article to be labeled, of a stationary shaft on which said drum is rotatably mounted, a driving wheel loose on said shaft and having a hub provided with a groove secured thereto, a spring pressed latch on the labeling drum having a spring for normally forcing it to swing against the hub and into said groove, whereby the labeling drum will be rotated positively with the driving wheel on the same shaft, and a lever pivoted on an axis tangent with respect to said shaft for engaging said latch to bring it into inoperative position, whereby when the lever is swung on its axis to one side it will release the latch and the labeling drum will be clutched to the hub automatically.

10. In a labeling machine, the combination with a rotary labeling disc having two arcuate pads around its circumference for receiving labels thereon, two label holders both arranged in such position that their top labels are substantially tangent to the surface of the labeling drum, means connected with said drum for operating both label holders when the two pads come into registration with them at their forward ends, and means for bringing the two labels into contact with the opposite sides of an article to be labeled so as to place two labels around the article opposite each other.

11. In a labeling machine, the combination with a labeling drum of skeleton form having a pair of curved pads arranged around its circumference, each having a perforated area at the advance end, and means for exhausting the air from behind the space of said area to hold the forward end of a label against the perforated surface, of a blanket mounted on each pad and having perforations therethrough registering with the first-named perforations, said blanket having a portion throughout the area of said perforations thicker than the remainder to provide a surface raised above the rest of its surface.

12. In a labeling machine, the combination with a wheel having a curved pad on its circumference for receiving the labels, the forward end of said pad having a series of perforations therethrough, a suction box behind the pad, a suction passage communicating with a source of reduced air pressure, and a valve for connecting the same to the suction box, said valve having a stem and a spring for holding it closed, of a stationary cam in position to engage the end of the stem to open the valve at the desired position to produce the desired suction.

13. In a labeling machine, the combination with a rotary labeling drum having a curved pad thereon, said pad having perforations therethrough at the forward end, a suction box communicating with the perforations, a pipe communicating with a source of reduced air pressure mounted in stationary position and having a chamber therein provided with perforations, a second chamber rotatable with the drum and having perforations registering with the first named perforations, and a pipe connecting the second chamber with the space under the suction box, said space being separated from the suction box by an automatic valve.

14. In a labeling machine, the combination of a labeling drum having a pad of arcuate form loosely mounted therein, means at the front end of the pad for temporarily holding the forward ends of the labels down on the pad as the drum rotates, a blanket on said pad held at the forward end positively, and yielding means at the rear end for holding said blanket taut.

15. In a labeling machine, the combination with a rotary drum, of a plate having a surface provided with a pad extending along it to receive an article to be labeled with its label side against the pad, said plate being capable of moving outwardly to apply pressure to the label.

16. In a labeling machine, the combination with a rotary drum, of a plate having a curved surface concentric with the drum and provided with a pad extending along said surface circumferentially to receive an article to be labeled with its label side against the pad, said plate being capable of moving backwardly relatively to the drum to wipe the label on the article.

17. In a rotary drum for a labeling machine, the combination with a pair of discs or wheels constituting the ends of the drum, of a plate mounted between them, the discs having means for locating the plate in position but leaving it free to move on the drum, and a pad of soft material over the surface of the plate for receiving the labeled sides of the articles to be labeled.

18. In a rotary drum for a labeling machine, the combination with a pair of discs or wheels constituting the ends of the drum, of a plate mounted between them, the discs having means for locating the plate in position but leaving it free to move radially and circumferentially on the drum, and means whereby, during the rotation of the drum, the said plate is given an outward and backward movement to smooth out the label on the article in contact with the pad.

19. In a rotary drum for a labeling machine, the combination with a pair of discs or wheels constituting the ends of the drum, of a plate mounted between them, the discs having means for locating the plate in position but leaving it free to move on the drum, a pad of soft material over the surface of the plate for receiving the labeled sides of the articles to be labeled, and means whereby during the rotation of the drum the said plate with its pad is given backward movement to smooth out the label on the article in contact with the pad.

20. In a labeling machine, the combination with a rotary drum comprising a pair of wheels rotatable together and cross pieces between the wheels to hold them together, of a soft pad having the same curvature as the circumference of the wheels, means for rolling the article with its label thereon over the pad, and means whereby as the article to be labeled is pressed against the pad with the label toward the pad and rolled therealong, the pad will be caused to move backwardly to wipe the label down smoothly on the article.

21. In a labeling machine, the combination with a rotary drum comprising a pair of wheels rotatable together and cross pieces between the wheels to hold them together, of a soft pad having the same curvature as the circumferences of the wheels, and means whereby, as the article to be labeled is pressed against the pad, the pad will be caused to move outwardly to wipe the label down smoothly on the article.

22. In a labeling machine, the combination with a rotary drum, of a plate loosely mounted on the drum and having a pad on the surface concentric with the surface of the drum and provided with means whereby the forward end of the label can be held thereto, means for rolling an article to be labeled along the pad to take up the label thereon, a stationary cam and means adapted to be operated by said cam for moving the plate and pad circumferentially and outwardly while the label is being rolled on the article to smooth out the label thereon.

23. In a labeling machine, the combination of a labeling drum having a plate of arcuate form loosely mounted therein, means at the front end of the plate for temporarily holding the forward ends of the labels down on the plate as the drum rotates, a cross piece on the drum in fixed position, a lever supported by the cross piece and having an end adapted to move said plate on the drum, and a stationary cam adapted to be engaged by the lever and to force the lever outwardly to operate the plate.

24. In a labeling machine, the combination with a drum consisting of a pair of wheels or discs of a curved plate thereon, means for holding the curved plate loosely to permit motion radially and circumferentially, a rubber pad located over the surface of the plate to receive the label and apply it to the article, a lever pivoted on the drum and having an end adapted to engage the plate, and a stationary cam in position to engage the lever and swing it to force the plate with its pad backwardly.

25. In a labeling machine, the combination of a drum consisting of a pair of wheels or discs with a curved plate thereon, means for holding the curved plate loosely to permit a slight motion radially and circumferentially, a rubber pad located over the surface of the plate to receive the label and apply it to the article, said plate having a bracket on the inner side, a lever pivoted on the drum and having an end adapted to engage the bracket and a roller on the other end, a stationary cam in position to engage the roller once during each rotation of the drum and swing the lever to force the plate with its pad backwardly and outwardly, and yielding means for returning the plate to its forward position.

26. In a labeling machine, the combination with a rotary labeling disc having two arcuate pads around its circumference for receiving labels thereon, of two label holders both arranged in such position that their top labels are substantially tangent to the surface of the labeling drum, means connected with said drum for operating both label holders when the two plates come into registration with them at their forward ends, said operation of the label holders consisting in the lifting of the tops thereof to loosen the labels to allow the top label to be picked off, means for gumming the two labels one after the other as the drum rotates, and means for bringing the two labels into contact with the opposite sides of an article to be labeled so as to place two labels around the article opposite each other.

27. In a labeling machine, the combination with a labeling drum rotatable on its own axis and having two arcuate pads on its circumference, one adjacent to the other, for receiving two separate labels, of a pair of label holders arranged with their top labels tangent to the drum and in position to engage respectively the two curved surfaces of said pads, a fixed cam, and means operated by the cam for operating both of the label holders when the drum rotates to a certain point, to loosen the labels and allow the top label to be taken off of each label holder by one of said pads.

28. In a labeling machine, the combination with a rotary drum, of a curved series of flexible bars arranged concentric with the drum at a distance therefrom to receive the articles to be labeled therebetween and cause the articles to be rolled along the surface of the drum, said bars being held along their centers so that their ends are free to yield and twist to accommodate irregularities in the articles and having soft pads on their ends for engaging said articles.

29. In a labeling machine, the combination with a rotary drum, of a series of flexible bars arranged concentric with the drum at a distance therefrom to receive the articles to be labeled therebetween, said bars being held along their centers so that their ends are free to yield and twist and having soft pads on their ends for engaging said articles.

30. In a labeling machine, the combination of a series of flexible bars, said bars being held along their centers so that their ends are free to yield and twist and having soft pads on their ends for engaging said articles.

In testimony whereof I have hereunto affixed my signature.

ENOCH J. ANDERSON.